(12) United States Patent
Dunphy et al.

(10) Patent No.: US 12,378,476 B2
(45) Date of Patent: Aug. 5, 2025

(54) METHOD FOR PYROLYSING PLASTIC MATERIAL AND A SYSTEM THEREFOR

(71) Applicant: Plastic Energy Limited, London (GB)

(72) Inventors: Patrick Dunphy, London (GB); Christopher Strivens, London (GB); Andres Yabrudy, London (GB); David McNamara, London (GB)

(73) Assignee: Plastic Energy Limited, London (GB)

( * ) Notice: Subject to any disclaimer, the term of this patent is extended or adjusted under 35 U.S.C. 154(b) by 263 days.

(21) Appl. No.: 17/787,695

(22) PCT Filed: Dec. 18, 2020

(86) PCT No.: PCT/GB2020/053304
§ 371 (c)(1),
(2) Date: Jun. 21, 2022

(87) PCT Pub. No.: WO2021/123822
PCT Pub. Date: Jun. 24, 2021

(65) Prior Publication Data
US 2023/0020918 A1    Jan. 19, 2023

(30) Foreign Application Priority Data
Dec. 20, 2019 (GB) .................................. 1919022.2

(51) Int. Cl.
C10B 53/07 (2006.01)
C08J 11/12 (2006.01)
C10B 47/18 (2006.01)

(52) U.S. Cl.
CPC ............... *C10B 53/07* (2013.01); *C08J 11/12* (2013.01); *C10B 47/18* (2013.01); *C10G 2300/1003* (2013.01)

(58) Field of Classification Search
CPC . C10B 53/07; C10B 47/18; C08J 11/12; C08J 11/10; C10G 2300/1003;
(Continued)

(56) References Cited

U.S. PATENT DOCUMENTS

2012/0261247 A1* 10/2012 McNamara ............... F23G 7/12
201/25
2014/0130404 A1* 5/2014 Brokaw .................. B01J 6/008
44/639
(Continued)

FOREIGN PATENT DOCUMENTS

CN    1942557 A    4/2007
CN    203782077 U    8/2014
(Continued)

OTHER PUBLICATIONS

Translation of JP4258791 (Year: 2000).*
(Continued)

*Primary Examiner* — Ali Z Fadhel
(74) *Attorney, Agent, or Firm* — Perkins Coie LLP

(57) ABSTRACT

A method for pyrolysing plastic material. The method comprises the steps of: heating and densifying plastic material; transporting the plastic material to one or more reactors; and pyrolysing the plastic material in the one or more reactors. The plastic material is maintained in a heated state during the transporting step. A system for pyrolysing plastic material is also provided.

26 Claims, 4 Drawing Sheets

(58) Field of Classification Search
CPC ............ C10G 2400/04; C10G 2400/06; C10G 2400/08; C10G 1/10; Y02P 20/143; Y02W 30/62
See application file for complete search history.

(56) References Cited

U.S. PATENT DOCUMENTS

| | | | |
|---|---|---|---|
| 2016/0017232 A1* | 1/2016 | Ullom | C10G 1/02 202/117 |
| 2017/0283706 A1* | 10/2017 | Schabel | C10B 7/10 |
| 2019/0177620 A1 | 6/2019 | Posmyk et al. | |

FOREIGN PATENT DOCUMENTS

| | | | | |
|---|---|---|---|---|
| CN | 105018127 | A | 11/2015 | |
| CN | 109562301 | A | 4/2019 | |
| CN | 109563411 | A | 4/2019 | |
| EA | 027197 | B1 | 6/2017 | |
| EP | 3260181 | A1 | 12/2017 | |
| JP | H09290907 | A * | 11/1997 | ............ B29B 17/04 |
| JP | 2000-117739 | A | 4/2000 | |
| JP | 2001-335657 | A | 12/2001 | |
| JP | 2005-170986 | A | 6/2005 | |
| JP | WO 2005077514 | A1 | 8/2005 | |
| JP | 2007-204516 | A | 8/2007 | |
| JP | 2007-529574 | A | 10/2007 | |
| JP | 2017-141374 | A | 8/2017 | |
| JP | 2019-524913 | A | 9/2019 | |
| KR | 10-2007-0010867 | A | 1/2007 | |
| KR | 10-2007-0032634 | A | 3/2007 | |
| RU | 2078111 | C1 | 4/1997 | |
| RU | 2532907 | C2 | 11/2014 | |
| RU | 2693800 | C1 | 7/2019 | |
| SU | 1758069 | A1 | 8/1992 | |
| WO | 2005087897 | A1 | 9/2005 | |
| WO | 2011077419 | A1 | 6/2011 | |
| WO | 2015/145189 | A1 | 10/2015 | |
| WO | 2018000050 | A1 | 1/2018 | |

OTHER PUBLICATIONS

See Translation of Japanese patent office cited in IDs filed on Sep. 29, 2023 (Year: 2023).*
Translation of a Second Office Action issued by the Russian Patent Offic, which corresponds to Russian Patent Application No. 2022119640/04(041401) and is related to U.S. Appl. No. 17/787,695.
Translation of an Office Action issued by the Russian Patent Office which corresponds to Russian Patent Application No. 2022119640/04(041401) and is related to U.S. Appl. No. 17/787,695.
Translation of an Office Action issued by the Japanese Patent Office on Aug. 29, 2023, which corresponds to Japanese Patent Application No. 2022-538244 and is related to U.S. Appl. No. 17/787,695.
Translation of a Search Report issued by the Chinese National Intellectual Property Administration on Feb. 1, 2024, which corresponds to Chinese Patent Application No. 202080095415.5 and is related to U.S. Appl. No. 17/787,695.
International Search Report issued in PCT/GB2020/053304; mailed Mar. 15, 2021.
Search and Examination Report issued by GB IPO in corresponding Application No. 1919022.2, dated Jun. 12, 2020.
Translation of an Office Action issued by the Korean Patent Office on May 16, 2024, which corresponds to Korean Patent Application No. 10-2022-7025278 and is related to U.S. Appl. No. 17/787,695.
Notice of Reasons for Refusal for Japan Patent Application No. 2024-064136, Applicant: Plastic Energy Limited , mailed Apr. 21, 2025, 3 pages.

* cited by examiner

METHOD FOR PYROLYSING PLASTIC MATERIAL AND A SYSTEM THEREFOR

TECHNICAL FIELD

The disclosure concerns a method for pyrolysing plastic material, and a system therefor.

BACKGROUND

End-of-life plastic chemical recycling is an emerging technology designed to recycle mixed waste-plastics into a variety of liquid hydrocarbon products. The waste plastics for use in such a process may, for example, include low density polyethylene (LDPE), high density polyethylene (HDPE), polystyrene (PS), and/or polypropylene (PP). These waste plastics are converted into the liquid hydrocarbon products by heating and then pumping the plastic feed in molten form into reactor vessels. The reactor vessels are heated by combustion systems to a temperature in excess of 350° C. This produces rich saturated hydrocarbon vapour from the molten plastic. This flows out of the reactor vessels through contactor vessels and will condense the heavier vapour fractions to maintain a target outlet temperature set point which is determined by the end-product specification. This is then distilled at near-atmospheric pressures in a downstream condensing column.

SUMMARY

According to the invention, there is provided a method for pyrolysing plastic material, the method comprising the steps of: heating and densifying plastic material; transporting the plastic material to one or more reactors; and pyrolysing the plastic material in the one or more reactors; characterised by maintaining the plastic material in a heated state during the transporting step.

Optionally, the plastic material is transported to two or more reactors, and the heated plastic material is delivered to one reactor at a time.

Optionally, the step of heating and densifying the plastic material is effected by extruding the plastic material.

Optionally, the plastic material is maintained in a melted state during the transporting step.

Optionally, a temperature of the plastic material is maintained at a temperature within a target temperature range.

Optionally, the target temperature range is lower than a decomposition temperature of the plastic material.

Optionally, a temperature of the plastic material is maintained at a temperature of at least 265° C.

Optionally, a temperature of the plastic material is maintained at a temperature of at least 280° C.

Optionally, a temperature of the plastic material is maintained at a temperature of no more than 310° C.

Optionally, a temperature of the plastic material is maintained at a temperature of no more than 300° C.

Optionally, the plastic material is heated to a temperature within the target temperature range during the heating and densifying step.

Optionally, the plastic material is at a temperature within the target temperature range at the end of the heating and densifying step.

Optionally, the plastic material is transported at a positive angle to the horizontal.

Optionally, the angle is selected from a range of from 10° to 45°.

According to the invention, there is further provided a system for pyrolysing plastic material, the system comprising: a pump for heating and densifying plastic material; one or more reactors for pyrolysing the plastic material; and a pipe for transporting the plastic material between the pump and the one or more reactors; wherein the pipe is configured to maintain the plastic material in a heated state.

Optionally, the system comprises two or more reactors, and the system further comprises a plurality of valves arranged such that heated plastic material can be delivered to one reactor at a time.

Optionally, the pump comprises an extruder.

Optionally, the pipe is configured to maintain the plastic material in a melted state.

Optionally, the pipe comprises heating means.

Optionally, the heating means comprises electric heat tracing.

Optionally, the pipe is oriented at a positive angle to the horizontal.

Optionally, the angle is selected from a range of from 10° to 45°.

Optionally, the system comprises a plurality of interlocked valves for delivering heated plastic material to two or more reactors.

BRIEF DESCRIPTION OF THE DRAWINGS

A preferred embodiment of the present invention will now be described, by way of example only, with reference to the accompanying drawings, in which.

DETAILED DESCRIPTION

End-of-life or contaminated plastic waste feedstock, for plastic chemical recycling, may be received from, for example, municipal recovery facilities, recycling factories, or other plastic collection sources. During a pre-treatment process, the feedstock may be refined such that it only contains plastics suitable for the chemical recycling process, such as low density polyethylene (LDPE), high density polyethylene (HDPE), polystyrene (PS), and/or polypropylene (PP). Unsuitable materials, such as metals, paper and card, and glass, as well as humidity from the plastic waste, may be removed.

Figure 1:
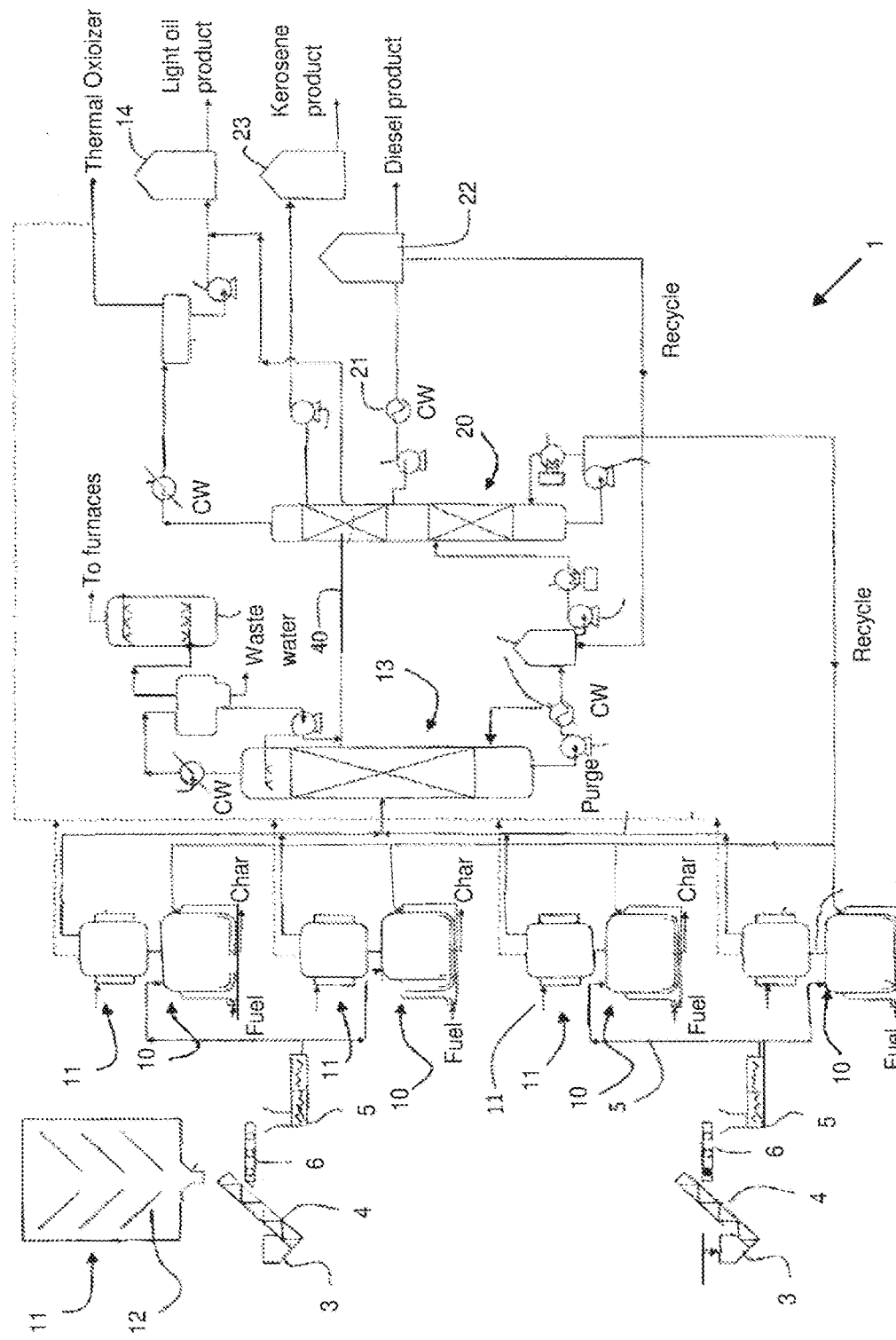
FIG. 1 shows a schematic of a known chemical recycling plant, as disclosed in WO-A-2011077419.

FIG. 1 illustrates a known chemical recycling plant 1, as disclosed in WO-A-2011077419, in which a pipe 2 according to the present disclosure may be employed. The pre-treated plastic feedstock may be processed to granular or flake form, which may enter the system at one or more infeed hoppers 3. A conveyor 4 may pass the plastics material to a pump 5 via a weigh belt 6. The plastics material may be melted in the pump 5 by a heating process, which may involve one or more heating and cooling stages, to a final maximum temperature in a region of 300° C. The melted plastic may be transported to one or more reactors 10 via a pipe 2.

In the one or more reactors 10, the feedstock may be heated in the absence of oxygen to achieve pyrolysis, such that the polymer molecules may break down to form a rich saturated hydrocarbon vapour. The hydrocarbon vapour may flow through a contactor 11 having a bank of condenser elements 12. Some long chain hydrocarbon components may condense, returning the condensed long-chain material to the reactor 10 to be further pyrolysed to achieve thermal degradation into shorter carbon-carbon chains; components may exit from the contactor 11 as a vapour.

The hydrocarbon vapour from the contactor may be received by a condensing column 13, which may separate the hydrocarbon vapour by molecular weight into condensable components and non-condensable synthetic gas components.

Condensable components, having a relatively larger molecular weight, may accumulate in one or more regions towards the middle and bottom of the condensing column 13 and may be drawn therefrom. For example, light oil and raw diesel may be drawn from the condensing column 13.

Non-condensable synthetic gas components, having a relatively smaller molecular weight, may accumulate in a region towards the top of the condensing column 13. These may be drawn from the top of the condensing column 13 and may, for example, be used for combustion in furnaces (not shown) of the recycling plant 1.

As a result of this process, the condensable gases may be converted to hydrocarbon products, while the non-condensable synthetic gases may be collected separately and combusted to process energy. The hydrocarbon products may be sold to the petrochemical industry to, for example, convert it back to virgin plastic, oil, or into transportation fuels. The synthetic gas may be used within the chemical recycling plant.

Figure 2:
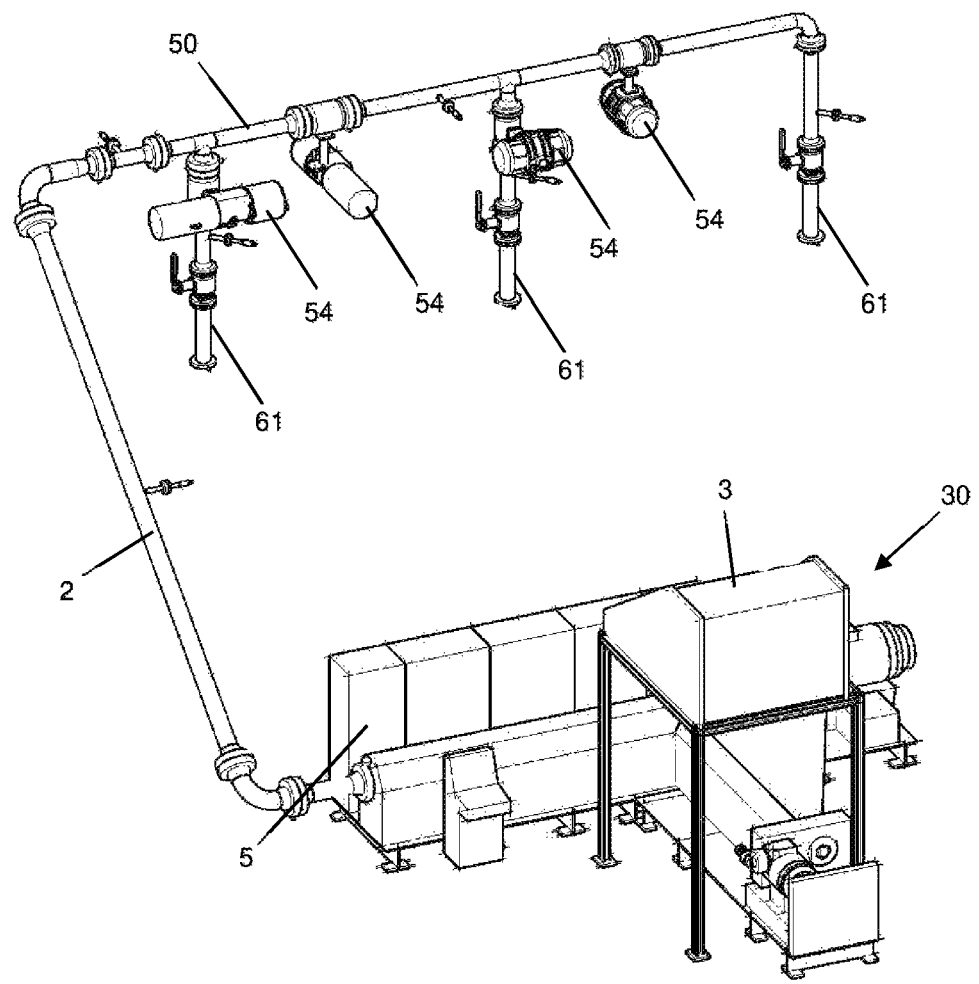
FIG. 2 shows a perspective view of the initial stages of a chemical recycling plant, forming part of a system according to the present disclosure.

FIG. 2 illustrates in greater detail the initial stages of a chemical recycling plant 1 such as that shown in FIG. 1, prior to pyrolysis of the feedstock. A feed system 30 may include an infeed hopper 3 (or silo), a conveyor (not shown), a weigh belt (or weigh-scales known as 'load cells') (not shown), and a pump 5.

Advantageously, the feedstock may be delivered to each reactor 10 at a controlled temperature within a target temperature range. Optimally, the temperature of the feedstock may be as close as possible to an operating temperature of the reactor 10, such that it will not adversely affect the thermal performance of the reactor 10; a temperature drop in the reactor 10 may slow, and may even halt, the depolymerisation process. The operating temperature of the reactor 10 during a phase of being fed feedstock may be in a range of from 380° C.-410° C. Additionally, if the temperature of the feedstock is too low, the feedstock may be too viscous to be transported along the pipe 2. In this regard, the temperature of the feedstock may be at least 265° C., optionally at least 280° C. This may ensure that the feedstock is in a suitably melted state. However, if the temperature of the feedstock is too high, the feedstock may begin to decompose before reaching the reactor 10. If the feedstock begins to decompose, coke (a form of carbon residue) may begin to form, which may be disadvantageous as discussed below. Thus the target temperature range may be lower than a decomposition temperature of the feedstock. In this regard, the temperature of the feedstock may not be greater than 310° C., optionally not greater than 300° C. A suitable target temperature range may therefore be 265° C. to 310° C., optionally 280° C. to 300° C.

The pump 5 may fulfil three functions: it may heat the feedstock to a temperature within the target temperature range; it may densify the feedstock, thereby removing any air pockets from the feedstock; and it may provide a driving force for transporting the feedstock to the reactor 10 via the pipe 2. In one example embodiment, the pump 5 may comprise an extruder, which may generally comprise an auger 40 (or screw) housed in a close-fitting barrel 41. The three functions may be effected by the action of the auger 40. The pump 5 may heat the feedstock from ambient conditions to a temperature within the target temperature range by applying shear force to the feedstock, the shear force being a result of relative motion between the auger 40 and a wall of the barrel 41. In this manner, the temperature of the feedstock in the pump 5 may progressively increase towards an outlet 42 of the pump 5. This may be advantageous in achieving a temperature within the target temperature range. In contrast, the usual operation of existing pumps may be for the temperature of the feedstock to peak at a point within the pump, and to reduce towards the outlet. The pump 5 may be provided with variable speed drives (not shown) that may permit lower flow rates to be fed to the reactor 10, if required, while maintaining a temperature within the target temperature range at the outlet 42 of the pump 5.

The pump 5 may be provided with one or more dual heating and cooling zones 43. The one or more dual heating and cooling zones 43 may assist in incrementally controlling the temperature of the feedstock as it passes along the auger 40. The heating function may primarily be used to melt feedstock entrained in the auger 40 during start-up of the system. The cooling function may be used during normal operation to prevent the zone temperatures from exceeding respective set points. The heating function may rarely be used during normal operation, as sufficient heat to melt the feedstock and achieve a temperature within the target temperature range at the outlet 42 may be provided by the shear force from the action of the auger screw.

Cooling of the barrel 41 may be achieved by a closed-loop oil cooling circuit or fans (not shown). A temperature sensor may monitor the temperature of each barrel zone. An observed over-temperature by a temperature sensor may cause the oil feed valve on the respective barrel zone to open, or the individual cooling fans to be activated, to allow cooling to the temperature set point.

Figure 3:
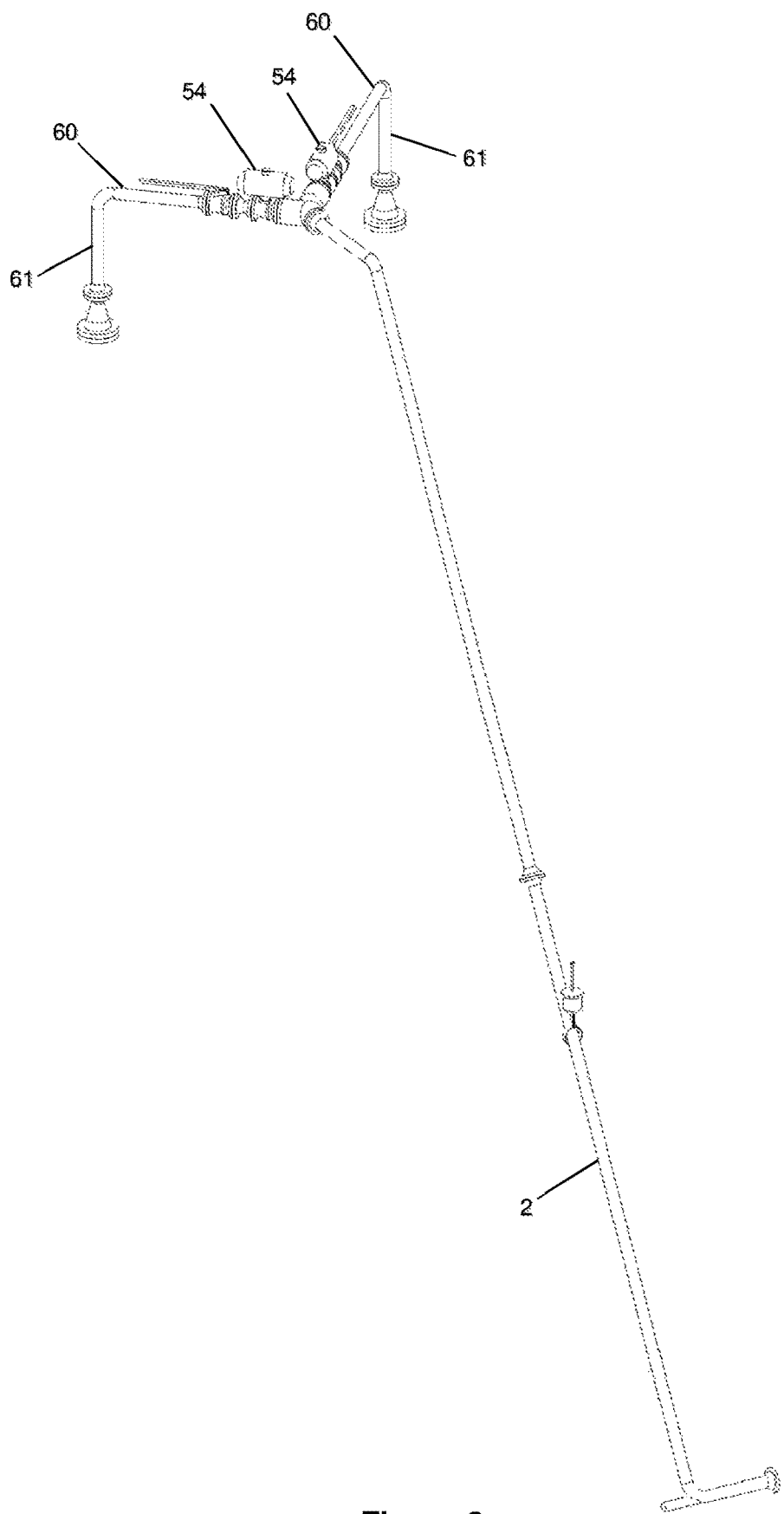
FIG. 3 shows an alternative pipe arrangement to that shown in FIG. 2.

The pipe 2 may connect the pump 5 to one or more reactors 10. Preferably, the pipe 2 may connect the pump 5 to multiple reactors 10. In one example arrangement, illustrated in FIG. 2, the pipe 2 may connect the pump 5 to one or more reactors 10 via a single header pipe 50. The header pipe 50 may be connected to each of the one or more reactors via a respective feed pipe 61. In an alternative example embodiment, illustrated in FIG. 3, the pipe 2 may connect the pump 5 to one or more reactors 10 via subsidiary pipes 60, with a subsidiary pipe 60 being provided for each reactor 10. Each subsidiary pipe 60 may be connected to its reactor 10 via a feed pipe 61. In both arrangements, the feed pipes 61 may be generally vertical.

The densified and melted feedstock exiting the outlet 42 of the pump 5 may be driven into and along the pipe 2 under sufficient pressure to drive the feedstock along the pipe 2 at required flow rates and temperature, but without the feedstock being at too high a pressure when arriving at the reactor 10, taking into account a pressure drop along the pipe 2. A suitable pressure of the feedstock when exiting the pump 5 (that is, at the pump outlet 42) may be in a range of from 3 MPaG to 15 MPaG (30 BarG to 150 BarG), optionally 5 MPaG to 8 MPaG (50 BarG 80 BarG).

Figure 4:
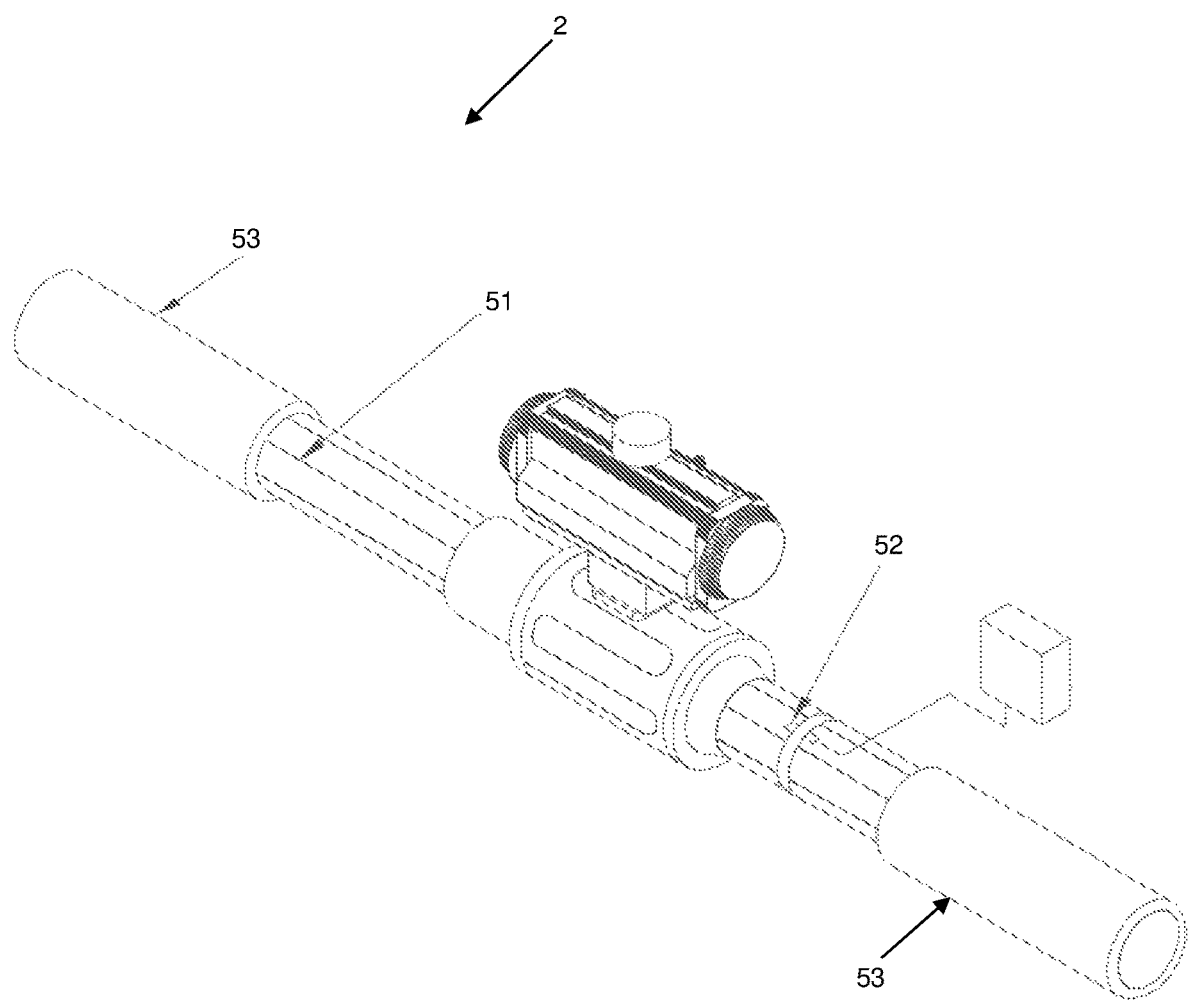
FIG. 4 shows a perspective view of a pipe for the system of FIG. 2, or for the alternative pipe arrangement of FIG. 3.

The pipe 2 is shown in greater detail in FIG. 4. The pipe 2 may be made of any suitable material, such as stainless steel or carbon steel. The pipe 2 may be provided with heating means 51. The heating means 51 may comprise electric heat tracing (also known as 'heat tape', or 'surface heating'). The heating means 51 may be used to ensure that a temperature within the target temperature range is maintained along the pipe 2. The heating means 51 may additionally be used to heat (and melt) existing feedstock entrained in the pipe 2 at start-up of the system.

One or more temperature sensors 52 and/or pressure sensors (not shown) may be provided to monitor temperature and pressure along the pipe 2 to ensure a stable flow. The temperature sensor 52 may comprise a thermocouple. The pipe 2 may further be provided with insulation 53.

A diameter of the pipe 2 may be selected such that it is small enough that heat may be maintained in the pipe 2 (or the feedstock may be heated at start-up of the system) via the heating means 51. Nevertheless, the diameter must be large enough to achieve required flow rates and pressure. The diameter of the pipe 2 may be selected from a range of from 150 mm-200 mm, optionally 200 mm.

A length of the pipe 2 may be minimised, whilst maintaining sufficient length to allow mechanical flexibility in the pipe 2 (to enable the pipe 2 to absorb thermal expansion stress). Minimising the length of the pipe 2 may be advantageous in respect of reducing the extent of the heating means 51 required for the pipe 2. Minimising the length of the pipe 2 may be advantageous in respect of reducing potential to 'coke' the pipe 2, which may be a greater risk for a longer pipe 2 due to a longer residence time of the feedstock in a longer pipe 2. If a continuous flow of feedstock is not maintained in the pipe 2, such that the feedstock may stand in the pipe 2 at an elevated temperature for extended periods, coke (a form of carbon residue) may begin to line the pipe 2. Such coke deposits may reduce the diameter of the pipe 2, thereby reducing flow rates in the pipe 2 and increasing pressure in the pipe 2. Coke deposits may also act as an insulator, which may result in more energy input being required from the heating means 51. The length of the pipe 2 may be selected from a range of from 5 m to 11 m, optionally 8 m.

The pipe 2 may be oriented at a positive angle to the horizontal, such that it may slope at a generally upward angle in a direction from the pump 5 to the header pipe 50 or to the subsidiary pipes 60 (that is, not sloping downwards or horizontal). A suitable angle may be in a range of from 10° to 45°. The feedstock at a temperature within the target temperature range may have the potential to flow under gravity. Orienting the pipe 2 at an upward angle may ensure that the pipe 2 may only discharge under the effect of the pump 5, and may not discharge under the effect of gravity. This may act to prevent the pipe from emptying during operation. If the pipe 2 were to empty, resulting in an opening in the pipe between the pump 5 and the reactor 10, hydrocarbon vapours from the reactor 10 may be released into the open pumping section, and/or air may enter the reactor systems, which may cause ignition.

If the pipe 2 is split into two (or more) subsidiary pipes, with a portion of the melted feedstock in the pipe 2 being simultaneously directed into each of the subsidiary pipes, due to undefined and variable preferential flow the melted feedstock may not equally distribute between the two (or more) subsidiary pipes. Instead, one subsidiary pipe may unpredictably have a preferred flow. Thus, if multiple reactors 10 are simultaneously fed by respective subsidiary pipes 60 (as shown, for example, in FIG. 3), or if multiple reactors 10 are simultaneously fed from a single header pipe 50 (as shown, for example, in FIG. 2), it may be extremely difficult (or even impossible) to control the volume of feedstock being fed to each reactor 10, resulting in an inability to control consistent and repeat batch cycles.

Advantageously, feedstock may instead be delivered to only one reactor 10 at a time. Two or more reactors 10 may be fed sequentially by the pipe 2, via the header pipe 50 or the subsidiary pipes 60. Each reactor 10 may be provided with a valve 54 to enable or prevent feedstock being provided to the respective reactor 10. Depending on the arrangement, the valve 54 for a particular reactor 10 may be located, for example, on the header pipe 50, on the subsidiary pipe 60, or on the feed pipe 61. Respective valves 54 for two or more reactors 10 may be interlocked to ensure that feedstock may only be fed to a single reactor 10 at any given time. This arrangement may allow a single pump 5 and a single pipe 2 to feed multiple reactors 10 independently of each other.

The header pipe 50 may be of a similar construction to pipe 2. The header pipe 50 may comprise one or more of the following features of the pipe 2: heating means 51; one or more temperature and/or pressure sensors; and/or insulation 53. The header pipe 50 may be oriented horizontally. A diameter of the header pipe 50 may be selected from a range of from 100 mm to 200 mm, optionally 150 mm. A length of the header pipe 50 may be selected from a range of from 7 m to 16 m, optionally 11 m. A pressure in the header pipe 50 may be selected from a range of from 1 MPaG to 6 MPaG (10 BarG to 60 BarG), optionally 2 MPaG to 4 MPaG (20 BarG to 40 BarG).

The subsidiary pipes 60 may again be of a similar construction to pipe 2. The subsidiary pipes 60 may comprise one or more of the following features of the pipe 2: heating means 51; one or more temperature and/or pressure sensors; and/or insulation 53. The subsidiary pipes 60 may be oriented horizontally. A diameter of each subsidiary pipe 60 may be selected from a range of from 100 mm to 200 mm, optionally 150 mm. A pressure in each subsidiary pipe 60 may be selected from a range of from 1 MPaG to 6 MPaG (10 BarG to 60 BarG), optionally 2 MPaG to 4 MPaG (20 BarG to 40 BarG).

In use, at start-up of the system (for example, after a turnaround), existing feedstock already entrained in the system, which may be in a solid state, may be heated. Feedstock entrained in the pump 5 may be heated using the heating function of the one or more dual heating and cooling zones 43. Feedstock entrained in the pipe 2 may be heated using the heating means 51.

When the existing feedstock entrained in the system has reached a temperature within the target temperature range, new feedstock may be added to the system. The new feedstock may arrive at the pump 5 in granular or flake form, and may be heated to a temperature within the target temperature range by the pump 5, by applying a shear force to the feedstock. The action of the auger 40 may also drive the feedstock into and along the pipe 2.

As the feedstock is transported along the pipe 2, its temperature may be maintained at a temperature within the target temperature range by the heating means 51.

The feedstock may be fed to the reactors 10 sequentially. In an example system having three reactors 10, a first reactor may be de-isolated and may be fed a predetermined volume of feedstock, after which it may be isolated. After the first reactor has been isolated, a second reactor may be de-isolated and may be fed the predetermined volume of feedstock, following which the second reactor may be isolated. The same process may be repeated for a third reactor. During the isolation time for each reactor 10, the reactor 10 may continue to pyrolyse the feedstock to produce hydrocarbon vapour. After the full sequence, pyrolysis of the existing feedstock in the first reactor may be substantially complete, such that the first reactor may again be ready for feeding.

Advantageously, the closed system may ensure that no air may enter the pipe 2. Additionally, pushing the feedstock in a single direction (from the pump 5 towards the reactors 10) in the closed system may compress the melted feedstock and may force any air pockets in the opposite direction.

The invention claimed is:

1. A method for pyrolysing plastic material, the method comprising:
heating and densifying plastic material;
transporting the plastic material to two or more reactors, wherein the heated plastic material is fed to only one reactor at a time using a plurality of interlocked valves;
pyrolysing the plastic material in the two or more reactors; and
maintaining the plastic material in a heated state during the transporting.

2. The method according to claim 1, wherein heating and densifying the plastic material is effected by extruding the plastic material.

3. The method according to claim 1, wherein the plastic material is maintained in a melted state during the transporting.

4. The method according to claim 1, wherein a temperature of the plastic material is maintained at a temperature within a target temperature range.

5. The method according to claim 4, wherein the target temperature range is lower than a decomposition temperature of the plastic material.

6. The method according to claim 1, wherein a temperature of the plastic material is maintained at a temperature of at least 265° C.

7. The method according to claim 1, wherein a temperature of the plastic material is maintained at a temperature of at least 280° C.

8. The method according to claim 1, wherein a temperature of the plastic material is maintained at a temperature of no more than 310° C.

9. The method according to claim 1, wherein a temperature of the plastic material is maintained at a temperature of no more than 300° C.

10. The method according to claim 4, wherein the plastic material is heated to a temperature within the target temperature range during the heating and densifying.

11. The method according to claim 10, wherein the plastic material is at a temperature within the target temperature range at an end of the heating and densifying.

12. The method according to claim 1, wherein the plastic material is transported at a positive angle to a horizontal axis.

13. The method according to claim 12, wherein the positive angle is selected from a range of from 10° to 45°.

14. A system for pyrolysing plastic material, the system comprising:
a pump for heating and densifying plastic material;
two or more reactors for pyrolysing the plastic material;
a plurality of valves, wherein each individual reactor includes a valve for enabling heated plastic material to be fed to the individual reactor; and
a pipe for transporting the plastic material between the pump and the two or more reactors;
wherein:
the pipe is configured to maintain the plastic material in a heated state, and
the plurality of valves are interlocked to feed heated plastic to only one reactor at a time.

15. The system according to claim 14, wherein the pump comprises an extruder.

16. The system according to claim 14, wherein the pipe is configured to maintain the plastic material in a melted state.

17. The system according to claim 14, wherein the pipe comprises heating means.

18. The system according to claim 17, wherein the heating means comprises electric heat tracing.

19. The system according to claim 14, wherein the pipe is oriented at a positive angle to a horizonal axis.

20. The system according to claim 19, wherein the positive angle is selected from a range of from 10° to 45°.

21. A method for pyrolysing plastic material, the method comprising:
heating and densifying plastic material;
transporting the heated plastic material to one or more reactors at a positive angle relative to a horizontal axis, wherein the heated plastic material is fed to only one reactor at a time using one or more valves individually corresponding to the one or more reactors;
pyrolysing the heated plastic material in the one or more reactors; and
maintaining the plastic material in a heated state during the transporting.

22. The method of claim 21, wherein the positive angle is 10° or greater.

23. The method of claim 21, wherein the positive angle is selected from a range of from 10° to 45°.

24. The method of claim 21, wherein the one or more reactors include two or more reactors and the one or more valves include two or more valves.

25. A system for pyrolysing plastic material, the system comprising:
a pump for heating and densifying plastic material;
one or more reactors for pyrolysing the plastic material;
one or more valves, wherein each of the one or more valves is individually coupled to a corresponding one of the one or more reactors for enabling heated plastic material to be fed to the corresponding reactor; and
a pipe for transporting the plastic material between the pump and the one or more reactors, wherein:
the pipe is configured to maintain the plastic material in a heated state; and
the pipe is oriented at a positive angle to a horizontal axis.

26. The system of claim 25 wherein the one or more reactors comprise two or more reactors and the one or more valves comprise two or more valves.

* * * * *

UNITED STATES PATENT AND TRADEMARK OFFICE
CERTIFICATE OF CORRECTION

| | | |
|---|---|---|
| PATENT NO. | : 12,378,476 B2 | Page 1 of 1 |
| APPLICATION NO. | : 17/787695 | |
| DATED | : August 5, 2025 | |
| INVENTOR(S) | : Patrick Dunphy et al. | |

It is certified that error appears in the above-identified patent and that said Letters Patent is hereby corrected as shown below:

In the Drawings

On sheet 1 of 4, in Figure 1, Line 2, delete "Oxioizer" and insert -- Oxidizer --.

Signed and Sealed this
Twenty-first Day of October, 2025

John A. Squires
*Director of the United States Patent and Trademark Office*